United States Patent Office 3,502,775
Patented Mar. 24, 1970

3,502,775
FUNGICIDAL COMPOSITIONS CONTAINING 3-PHENYLINDAZOLE
Laurent Lacroix, Paris, France, assignor to Rhone-Poulenc S.A., Paris, France, a corporation of France
No Drawing. Filed Jan. 23, 1967, Ser. No. 610,814
Claims priority, application France, Jan. 26, 1966, 47,330
Int. Cl. A01n 9/22
U.S. Cl. 424—273     4 Claims

ABSTRACT OF THE DISCLOSURE

Compositions comprising 3-phenylindazole are employed as fungicides in agriculture and in the treatment of materials, such as fabric, to destroy or inhibit the growth of moulds.

---

This invention relates to new fungicidal compositions and their use for the destruction of harmful fungi.

It has unexpectedly been found after research and experimentation that 3-phenylindazole of the formula:

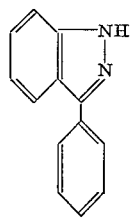

is an excellent fungicide.

3-phenylindazole may be obtained, for example, by the method described by W. Borsche and W. Scriba, Ann. Chem., 540, 83 (1939), by cyclization of 2-bromobenzophenone hydrazone, but carrying out the cyclization in dimethylformamide in the presence of sodium carbonate and copper powder.

3-phenylindazole possesses remarkable fungicidal properties as is shown by the results obtained in the following tests:

(1) ACTIVITY IN VITRO: DILUTION METHOD 3-phenylindazole is incorporated in liquid Sabouraud's agar at 50° C. in a range of predetermined concentrations. The medium thus prepared is inoculated after cooling with a normalised suspension of spores or mycelial fragments of fungi (concentration: 150,000 spores per cc.; age: 18 to 21 days depending upon the species). After incubation for 7 days at 24° C., the development of the moulds is observed, and there is determined for each strain of fungus employed the minimum concentration of 3-phenylindazole in mg./l. ($AC_{95-100}$) which produces 95% to 100% inhibition of the fungus.

The following results were obtained.

| Fungus: | $Ac_{95-100}$ in mg./l. |
|---|---|
| Saccharomyces pastorianus | 250 |
| Fusarium oxysporum | 250 |
| Botrytis cinerea | 125 |
| Trichophyton mentagrophytes | 50 |
| Candida albicans | 250 |
| Penicillium digitatum | 200 |
| Rhizopus nigricans | 200 |
| Aspergillus niger | 150 |

(2) ACTIVITY IN VIVO (a) On bean anthracnose

Young runner bean plants are treated, as soon as the cotyledons open, by spraying them with a suspension of 3-phenylindazole in water to which has been added 0.02% of polyoxyethylenesorbitol monooleate (Tween 80). Four hours after this treatment, the plants are artificially contaminated by spraying them with a normalised aqueous suspension of spores of *Colletotrichum lindemuthianum* (concentration: 150,000 spores per cc.). After incubation at 22° C. for 8 days, the development of the parasite is noted by counting the necroses formed on the leaves and the stems of the plant. The minimum concentration of 3-phenylindazole in mg./l. ($AC_{95-100}$) which produces 95% to 100% inhibition of these necroses is thus determined.

(b) On tomato mildew

Tomato plants aged 4 weeks are treated by spraying them with a suspension of 3-phenylindazole in water to which has been added 0.02% of polyoxyethylenesorbitol monooleate (Tween 80). Four hours after this treatment, the plants are artificially contaminated by spraying them with a normalised aqueous suspension of spores of *Phytophthora infestans* (concentration: 150,000 spores per cc.). After incubation at 22° C. for 8 days, the development of the parasite is observed by counting the necroses formed on the leaves and the stems of the plant. The minimum concentration of 3-phenylindazole in mg./l. ($AC_{95-100}$) which produces 95% to 100% inhibition of these necroses is thus determined.

(c) Tobacco mildew

Tobacco plants aged 4 weeks are treated by spraying them with a suspension of 3-phenylindazole in water to which has been added 0.02% of polyoxyethylenesorbitol monooleate (Tween 80). Four hours after this treatment, the plants are artificially contaminated by spraying them with a normalised aqueous suspension of spores of *Peronospora tabacina* (concentration: 150,000 spores per cc.). After incubation at 22° C. for 8 days, the development of the parasite is observed by noting the points of contamination on the leaves. The minimum concentration of 3-phenylindazole in mg./l. ($AC_{95-100}$) which produces 95% to 100% inhibition of the parasite is thus determined.

(d) On cucumber mildew

Cucumber plants aged about 1 month are treated by spraying them with a suspension of 3-phenylindazole in water to which has been added 0.02% of polyoxyethylenesorbitol monooleate (Tween 80). After this treatment, the plants are artificially contaminated by spraying them with a normalised aqueous suspension of spores of *Erysiphe cichoracearum* (concentration: 150,000 spores per cc.). After incubation at 22° C. for 8 days, the development of the parasite is observed. The minimum concentration of 3-phenylindazole in mg./l. ($AC_{95-100}$) which produces 95% to 100% inhibition of the parasite is thus determined.

The results obtained are as follows.

| Parasite: | $AC_{95-100}$ in mg./l. |
|---|---|
| Colletotrichum lindemuthianum | 500 |
| Phytophthora infestans | 750 |
| Peronospora tabacina | 1000 |
| Erysiphe cichoracearum | 1000 |

(3) ACTIVITY IN THE FIELD OF PROTECTION OF MATERIALS

Small strips of fabric measuring 15 cm. x 3 cm. are dipped into a suspension of 3-phenylindazole in various concentrations in water, to which has been added 0.02% of polyoxyethylenesorbitol monooleate (Tween 80), until they are well impregnated.

After immersion, the strips are either buried in the ground (soil of high humus content) in order that they may be exposed to the microorganisms of the soil, or they are subjected to the action of cellulolytic moulds in an artificial medium consisting of:

| | G. |
|---|---|
| Ammonium nitrate | 3 |
| Magnesium sulphate, $7H_2O$ | 0.5 |
| Potassium chloride | 0.25 |
| Monopotassium phosphate | 1 |
| Agar | 20 |

Distilled water, q.s. for 1000 cc.

The cellulolytic moulds employed are: *Chaetomium globosum, Stachybotrys atra, Penicillium funiculosum, Alternaria tenuis, Cladosporium herbarum, Trichoderma viride, Aspergillus flavus, Precilomyces varieti, Pullularia pullulans* and *Aspergillus niger*.

The period of burial in the ground or exposure to the moulds is 3 weeks, the temperature being 20° C. for the tests in the ground and 25° C. for the tests in the artificial medium.

At a concentration of 0.1% in the immersion bath, 3-phenylindazole affords complete protection to the strips of fabric both against microorganisms of the soil and against cellulolytic moulds.

The present invention, therefore, provides fungicidal compositions containing, as an active ingredient, 3-phenylindazole in association with at least one compatible diluent known to be suitable for use in fungicidal compositions. The diluent can be a liquid, preferably containing a wetting, dispersing or emulsifying agent, or a solid. Preferably the compositions contain between 0.005 and 90% by weight of 3-phenylindazole.

More particularly, 3-phenylindazole may be dispersed or dissolved in a liquid diluent to form suspensions, emulsions or solutions. Liquids suitable as diluents are water, and aqueous-organic and organic media, for example, aromatic hydrocarbons such as toluene and xylene, acetone, methylene chloride and dimethylformamide, and mineral, animal and vegetable oils. The compositions in the form of suspensions, emulsions or solutions may contain wetting, dispersing or emulsifying agents of the ionic or non-ionic type, for example sulphoricinoleates, quaternary ammonium derivatives, or products based on condensates of ethylene oxide, such as condensates of ethylene oxide with octylphenol, or fatty acid esters of anhydrosorbitols which have been rendered soluble by etherification of the free hydroxyl group by condensation with ethylene oxide. It is preferable to use agents of the non-ionic type because they are not sensitive to electrolytes. When desired, the emulsions of 3-phenylindazole may be in the form of self-emulsifying concentrates containing the active substance dissolved in the emulsifying agent or in a solvent containing an emulsifying agent compatible with the 3-phenylindazole and solvent, a simple addition of water to such concentrates producing compositions ready for use.

Examples of suitable solid diluents for association with 3-phenylindazole are talc, calcined magnesia, kieselguhr, tricalcium phosphate, powdered cork, absorbent carbon black, a clay such as kaolin or bentonite or a compatible solid, wetting or dispersing agent. The solid compositions, which may take the form of dusts, granules or wettable powders, are preferably prepared by grinding 3-phenylindazole with the solid diluent or by impregnating the solid diluent with a solution of 3-phenylindazole in a volatile solvent, evaporating the solvent and, if necessary, grinding the product so as to obtain a powder. Granular formulations may be prepared by absorbing 3-phenylindazole dissolved in a volatile solvent onto the solid diluent in granular form and evaporating the solvent, or by granulating compositions in powder form obtained as described above. A wetting, dispersing or emulsifying agent, which can be present in solid compositions of the invention, particularly in wettable powders, may be of the ionic or non-ionic type, for example any of those described above. Wettable powders according to the present invention may be treated with water immediately before use to give compositions ready for application.

Fungicidal compositions in the form of aerosols containing 3-phenylindazole are also within the scope of the present invention.

Fungicidal compositions according to the invention for agricultural use may be employed for the treatment of plants or trees infected by fungi, or to prevent infection by fungi. Preferably they are used to inhibit foliar parasites such as apple-scab, potato blight and tobacco mildew. Advantageously, compositions containing from 100 to 200 g. of 3-phenylindazole per hectolitre of water are employed.

The present invention also includes the use of 3-phenylindazole for the protection of materials of all kinds against attack by moulds. The usual methods may be employed to effect the protection of the materials. A preferred method consists in dipping the material to be protected in a suspension of 3-phenylindazole in water to which there has been added a wetting agent, or in a solution of 3-phenylindazole in an organic solvent such as acetone, ethanol, methylene chloride or dimethylformamide. Preferably suspensions or solutions containing from 0.5% to 2% of 3-phenylindazole are employed.

The following examples illustrate fungicidal compositions according to the invention.

EXAMPLE I

To 500 g. of 3-phenylindazole are added 25 g. of sodium ligno-sulphite, 470 g. of kaolin and 5 g. of "Tween 80," After grinding and screening, the powder obtained is employed to protect plants against attack by fungi, using it after dilution with water in a proportion of 400 g. of powder to 100 litres of water.

EXAMPLE II 2 g. of "Tween 80" and 10 litres of water are added with stirring to 50 g. of 3-phenylindazole. The suspension thus obtained is employed for dipping natural or synthetic fabrics for protection against attack by moulds.

I claim:
1. A method of destroying and inhibiting the growth of cellulolytic mold-producing fungi comprising applying thereto a fungicidal amount of 3-phenylindazole.
2. Method according to claim 1 in which the 3-phenylindazole is applied in admixture with water, in a proportion of from 100 to 200 g. of 3-phenylindazole per hectolitre of water.
3. Method according to claim 1 in which 3-phenylindazole is applied to said fungi on a fabric.
4. Method according to claim 3 in which the fabric is treated with a suspension or solution of 3-phenylindazole in a compatible liquid, said suspension or solution containing 0.5 to 2% by weight of 3-phenylindazole.

References Cited

UNITED STATES PATENTS 3,102,840   9/1963   Musser et al.

OTHER REFERENCES

Chemical Abstracts, 1939, vol. 33, 8197(5).
"Fungitoxicity of Heterocyclic CPOS.," Horsfall et al., contributions of Boyce Thompson Institute, vol. 16, 1951, pp. 344–346.

ALBERT T. MEYERS, Primary Examiner
L. SCHENKMAN, Assistant Examiner